(12) United States Patent
Louch

(10) Patent No.: US 8,184,096 B2
(45) Date of Patent: May 22, 2012

(54) CURSOR TRANSITIONS

(75) Inventor: John O. Louch, San Luis Obispo, CA (US)

(73) Assignee: Apple Inc., Cupertino, CA (US)

( * ) Notice: Subject to any disclaimer, the term of this patent is extended or adjusted under 35 U.S.C. 154(b) by 927 days.

(21) Appl. No.: 11/999,378

(22) Filed: Dec. 4, 2007

(65) Prior Publication Data

US 2009/0140978 A1    Jun. 4, 2009

(51) Int. Cl.
*G06F 3/033* (2006.01)
*G06F 3/00* (2006.01)

(52) U.S. Cl. ........................ 345/157; 715/856

(58) Field of Classification Search ............... 345/157; 715/856, 861

See application file for complete search history.

(56) References Cited

U.S. PATENT DOCUMENTS 5,850,212 A * 12/1998 Nishibori ............... 345/160
6,100,871 A * 8/2000 Min ........................ 715/861

* cited by examiner

*Primary Examiner* — Kevin M Nguyen
(74) *Attorney, Agent, or Firm* — Fish & Richardson P.C.

(57) ABSTRACT

Responsive to a trigger event, a first cursor state having a first visual appearance is transitioned into a second cursor state having a second visual appearance. A transition type and transition time can be specified so that the transition can be visually perceived by a user. The cursor states can be associated with different cursor types and/or cursor schemes.

15 Claims, 4 Drawing Sheets

| Event ID | Current State | Target State | Transition Type | Duration |
|---|---|---|---|---|
| 1 | Crosshair | Arrow | Cross Dissolve | 2 sec |
| 2 | Arrow | Crosshair | Cross Dissolve | 2 sec |
| 3 | Arrow | Text | Cross Dissolve | 2 sec |
| 4 | Text | Arrow | Cross Dissolve | 2 sec |
| 5 | Arrow Scheme A | Arrow Scheme B | Flip | 2 sec |
| 6 | Crosshair Scheme A | Crosshair Scheme B | None | — |

CURSOR TRANSITIONS

TECHNICAL FIELD

The subject matter of this patent application is generally related to cursors.

BACKGROUND

A cursor is a moving placement or pointer that indicates a position on a display. Some computer operating systems use multiple cursor types. For example, an arrow cursor may be used in one application and a crosshair or text cursor may be used in another application. Different cursor types can help a user interact with an operating system and applications.

Cursors often run in hardware (e.g., on a video card) separated from the main computer. Different cursor types can help a user interact with an operating system application and controls. Cursors can also provide feedback about what will happen when a mouse or other pointing device is manipulated by the user.

SUMMARY

Responsive to a trigger event, a first cursor state having a first visual appearance is transitioned into a second cursor state having a second visual appearance. A transition type and transition time can be specified so that the transition can be visually perceived by a user. The cursor states can be associated with different cursor types and/or cursor schemes. Smoothly and gradually transitioning the visual appearance of cursor from a first cursor state (e.g., a small cursor) to a second cursor state (e.g., a large cursor) can provide a pleasing visual effect for the user.

DESCRIPTION OF DRAWINGS

FIG. 3 illustrates an example data structure for storing cursor transition information.

DETAILED DESCRIPTION

Cursor Transition Overview

Figure 1A:
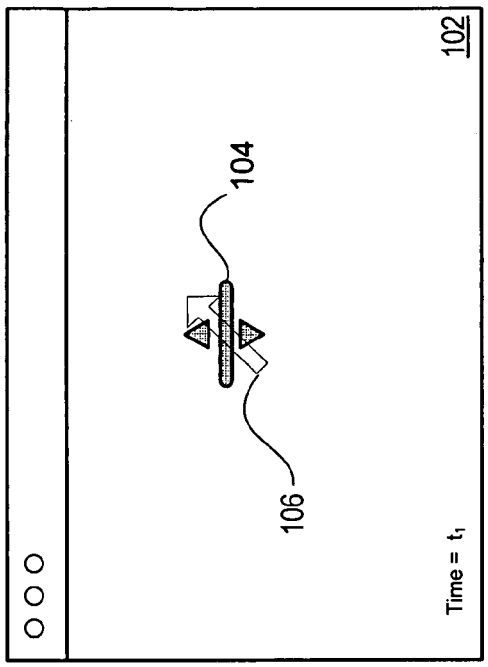
FIGS. 1A-1D illustrate an example cross-fade transition of a cursor from a current state to a target state using a transition effect.

FIGS. 1A-1D illustrate an example cross-fade transition of a cursor from a current state to a target state using a transition effect. In FIG. 1A, at a time $t_0$, a crosshair cursor 104 is displayed in a user interface 102. The user interface 102 can be any display area (e.g., a window, a desktop, a pane display) of any device (e.g., a personal computer, smart phone, email device, media player/recorder, personal digital assistance, game console, e-tablet). The cursor 104 can be generated by an operating system (e.g., Apple Inc.'s Mac OS X) or an application (e.g., word processor, email client).

Generally, a cursor is an indicator used to show the position in a user interface that will respond to input. In many graphical user interfaces (GUIs), a mouse cursor changes shape depending on context. For example, when the cursor is overlying text that the user can select or edit, the cursor changes to a vertical bar or "I-beam." When displaying a document, the cursor can appear as a hand with all fingers extended allowing scrolling by "pushing" the displayed page around. Graphics-editing cursors such as brushes, pencils or paint buckets may display when the user edits an image. On an edge or corner of a window the cursor usually changes into a double arrow (horizontal, vertical, or diagonal) indicating that the user can drag the edge/corner in an indicated direction in order to adjust the size and shape of the window. While a computer process is performing tasks and cannot accept user input; a wait cursor (e.g., spinning ball in Mac OS X) is often displayed when the mouse cursor is in a corresponding window. In some implementations, cursors run in hardware (e.g., a video card), separated from the main computer.

The cursor can change as the user navigates around the user interface. For example, when a user navigates a user interface for an email application (e.g., Microsoft Outlook®) and hovers in a menu or tool bar or panel, an arrow cursor may be displayed allowing the user to point and click a user interface element (e.g., a button). When the user moves the cursor into a text editing window in the same user interface, the cursor changes to a text cursor (e.g., I-beam). Often the change between cursor types is so fast that the transition from one cursor type to the next cursor type cannot be visually perceived by the user. The change in visual appearance of the cursor can be jarring to the user. Some examples of cursor transitions that can be visually jarring to a user include but are not limited to transitioning between black and white cursors, transitioning between small and large cursors, transitioning between different color cursors, etc.

In the disclosed implementations, a transition effect (e.g., cross dissolve) is applied to the cursor and the transition is slowed down so that it can be visually perceived by the user. This visually perceived transition is applied between two cursor states in an elegant and aesthetically pleasing manner.

Figure 1B:
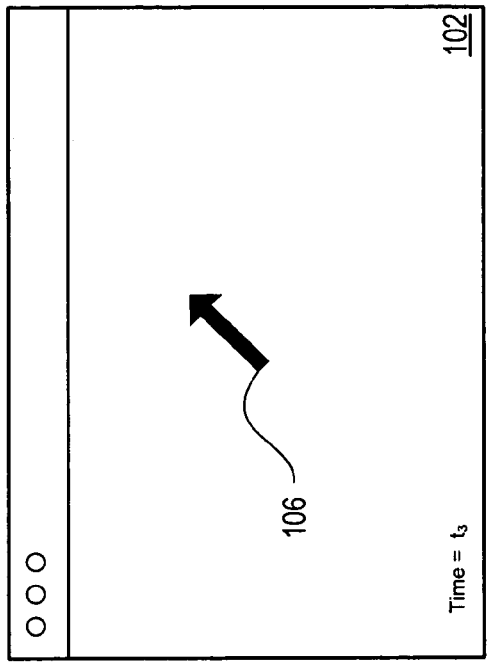

Referring to FIG. 1B, at time $t_2$, a cross dissolve transition effect is applied to the cursor 104 which begins to fade out or dissolve the cursor 104 and to fade in the cursor 106 (e.g., an arrow cursor). The transition can be applied over a determined period of time (e.g., 2 seconds). In some implementations, the time period can be specified by a user through a control panel or similar input mechanism. In other implementations, the time period can be controlled either by the system, user or the application that is changing the cursor.

Figure 1C:
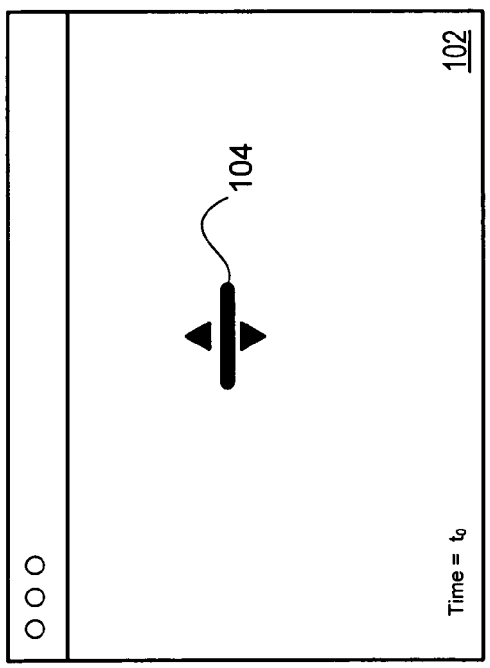
Figure 1D:
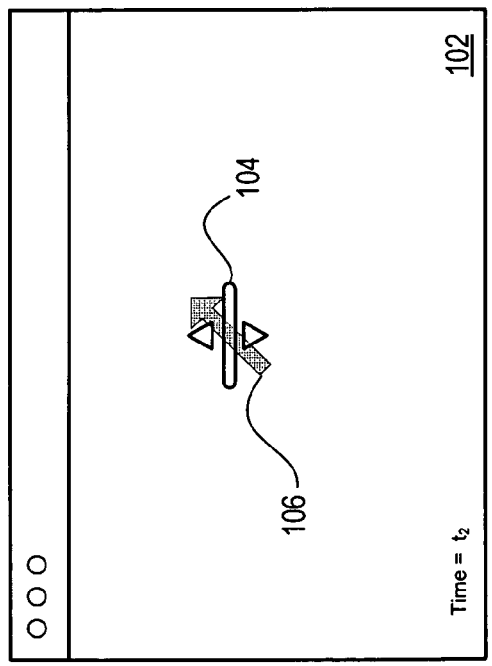

Referring to FIG. 1C, at a time $t_2$ (e.g., 1 second), the cursor 104 is now partially dissolved and the cursor 106 is partially visible. In FIG. 1D, at a time $t_3$, the cursor 104 is now completely dissolved and no longer visible in the user interface 102, and the cursor 106 is now fully visible.

As illustrated in FIGS. 1A-1D, a cursor can transition from a current state to a target state using a transition effect which is applied over a period of time so that the transition can be visually perceived by the user. By selecting an appropriate transition effect and duration for applying the effect, an aesthetically pleasing transition is presented to the user. Any suitable transition effect can be used including but not limited to: dissolves, wipes, flips, maps, iris, fades, morphing, flash animation, burn, 3D, etc. A cursor "state" can be associated with a cursor type (e.g., arrow, crosshair, I-beam, hour glass, spinning wheel, hand) or cursor scheme (e.g., size, shape, fill pattern, color, opacity).

In some implementations, the user can specify a transition effect and a duration for the effect. These specifications can be made through a menu system or other input mechanism, or can be specified in a cursor editor (e.g., ICONStudio 5.0, Sib cursor editor 3.0). If a cursor editor is used, the user can specify a transition type and duration, apply a transition effect for the duration, preview the transition in realtime and make timing adjustments until the desired transition effect is achieved.

Example Process

Figure 2:
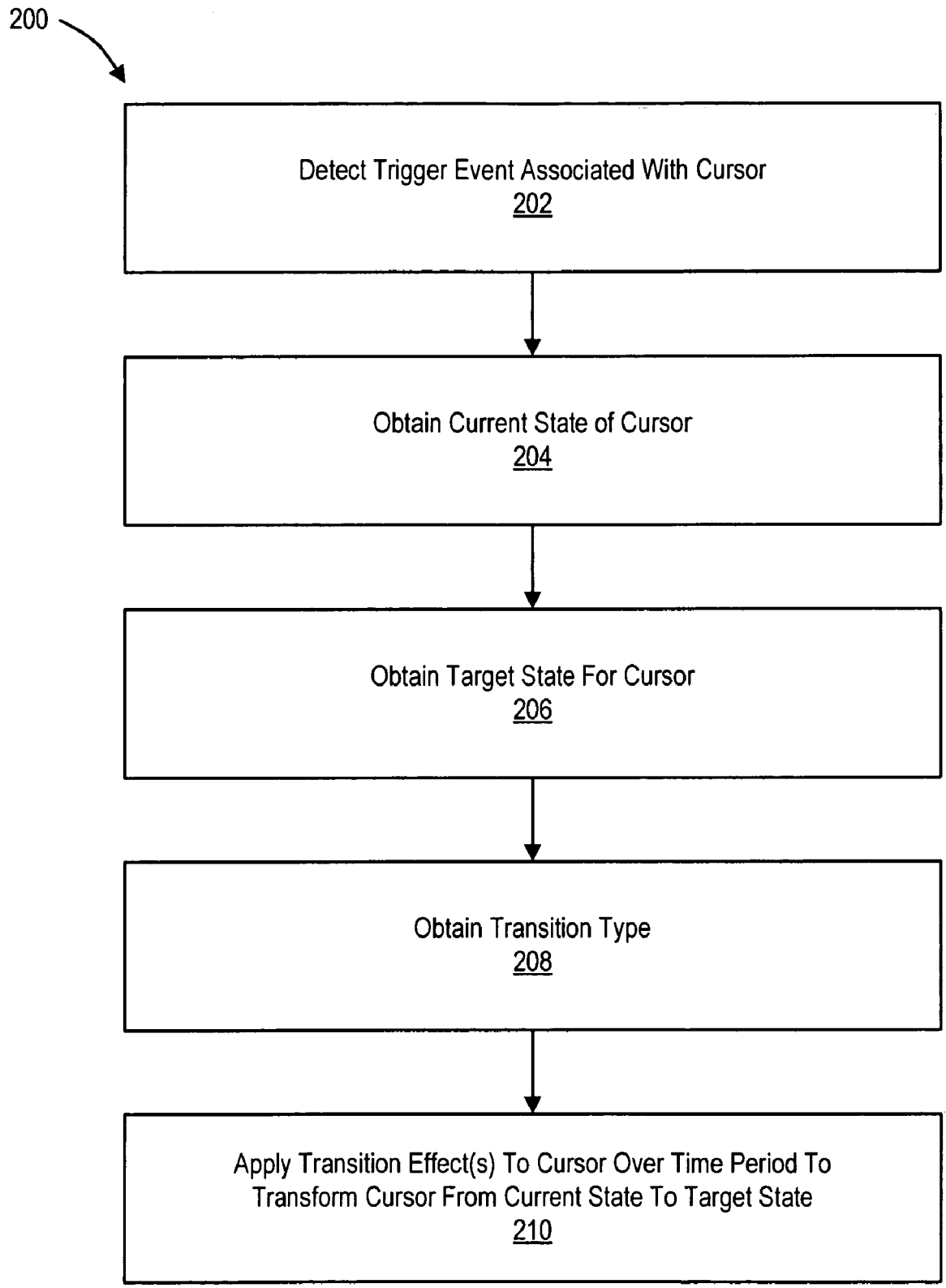
FIG. 2 is a flow diagram of an example process for the cursor transition of FIG. 1.

FIG. 2 is a flow diagram of an example process 200 for the cursor transition of FIG. 1. In some implementations, a trigger event associated with a cursor is detected (202). The trigger event can be a navigation action in a user interface. For example, when the user moves from a first portion of the user interface to a second portion of the user interface a trigger event is detected. In another example, a trigger event can occur when the user focuses the cursor in a window or hovers on a user interface element (e.g., a button, tool bar, dock). In some implementations, trigger events can be initiated automatically by an operating system or application. In other implementations, the user can also specify trigger events for cursor transitions.

A current state of the cursor is obtained (204) and a target state of the cursor is obtained (206). Cursor types can include but are not limited to: arrow, text cursor, hand, wait, edit, move, and resize. For example, a current state may be associated with a first cursor type (e.g., a crosshair) and a target state may be associated with a second cursor type (e.g., an arrow) which can be the same or different than the first cursor type. A cursor state may also be associated with a particular cursor scheme. For example, a cursor scheme may be a theme (e.g., nature, animals, holidays, sports) or a color scheme. Thus a current arrow cursor may transition into a target arrow cursor that has a different cursor scheme.

After the current and target states are obtained, a transition type is obtained (208). For example, a particular transition type may be associated with one or more transition effects (e.g., dissolve, map, burn, iris, mix, wipe, digital effect, slide, stretch, page peel, 3D and flash animation). A transition type may be assigned to a particular combination of current and target cursor states. This assignment can be made automatically or can be specified by a user. The assignments can be stored in a data structure which may be editable by the user. An example data structure is described in reference to FIG. 3.

Once the transition type is obtained, one or more transition effects are applied to the cursor over a specified period of time (e.g., 2 seconds) to transform the current state into the target state (210). Ideally, the one or more transition effects are applied to provide a cursor transition having an aesthetically pleasing appearance to the user.

Example Data Structure

FIG. 3 illustrates an example data structure 300 for storing cursor transition information. The data structure 300 can be a table stored in a file, for example. In some implementations, the data structure 300 can include a table having rows and columns where each row is associated with a particular trigger event. In the example shown, the columns include: Event ID, Current State, Target State, Transition Type and Duration. Other data structures are possible. For example, other table configurations are possible which include more or fewer columns.

Referring to the first row of the data structure 300, if an Event ID 1 occurs and the cursor is currently a crosshair type cursor, then a cross dissolve transition effect will be applied to the crosshair cursor for 2 seconds until the crosshair cursor is transformed into an arrow cursor, i.e., the target state of the cursor for Event ID 1. The second row of the data structure 300 describes a transition back to the crosshair, and is labeled as an Event ID 2.

Referring to the third row, if an Event ID 3 occurs and the cursor is currently an arrow type cursor, then a cross dissolve transition effect will be applied to the arrow cursor for 2 seconds until the arrow cursor is transformed into a text cursor (e.g., an I-beam), which is the target state associated with Event ID 3. The fourth row of the data structure 300 describes a transition back to the arrow and is labeled as an Event ID 4.

Referring to the fifth row, if an Event ID 5 occurs and the cursor is an arrow scheme A, then a flip transition effect will be applied to the arrow scheme A cursor for 2 seconds until the arrow scheme a cursor is transformed into an arrow scheme B cursor, which is the target state associated with Event ID 5.

The data structure 300 can be modified as desired. For example, the transition type fields can be expanded to include subfields for adding multiple transition types or specifying specific transition effects. The duration fields can be similarly expanded to include subfields that correspond to the transition type subfields to allow for user-specified independent durations for corresponding transition effects. In some implementations, the data structure 300 may specify that no transition effect will be applied, as illustrated by the sixth row of the data structure 300.

Example System

Figure 4:
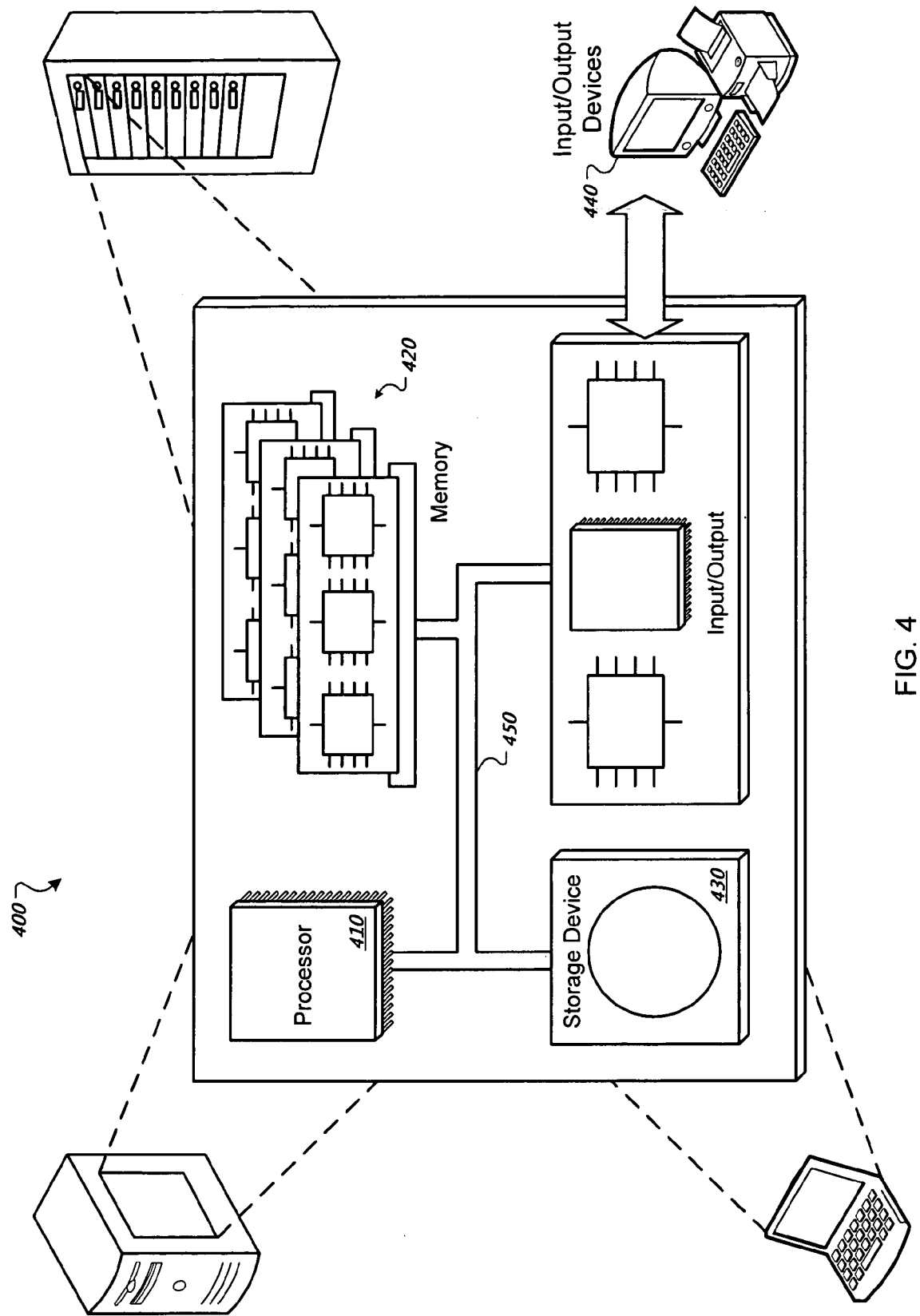
FIG. 4 is a block diagram of an example system for performing the various operations described in reference to FIGS. 1-3.

FIG. 4 is a block diagram of an example system 400 for performing the various operations described in reference to FIGS. 1-3. The system 400 can be a personal computer, a mobile phone, a smart phone a personal digital assistant, a media player/recorder, a game console, an email device, an e-tablet and any other device capable of displaying a cursor.

In some implementations, the system 400 includes a processor 410, a memory 420, a storage device 430, and an input/output device 440. Each of the components 410, 420, 430, and 440 can be interconnected using a system bus 450. The processor 410 is capable of processing instructions for execution within the system 400. In some implementations, the processor 410 is a single-threaded processor. In other implementations, the processor 410 is a multi-threaded processor. The processor 410 is capable of processing instructions stored in the memory 420 or on the storage device 430 to display graphical information for a user interface on the input/output device 440. In some implementations, more than one processor and/or processor core can be used in a parallel processing architecture.

The memory 420 stores information within the system 400. In some implementations, the memory 420 is a computer-readable medium. In other implementations, the memory 420 is a volatile memory unit. In yet other implementations, the memory 420 is a non-volatile memory unit.

The storage device 430 is capable of providing mass storage for the system 400. In some implementations, the storage device 430 is a computer-readable medium. In various different implementations, the storage device 430 may be a floppy disk device, a hard disk device, an optical disk device, or a tape device.

The input/output device 440 provides input/output operations for the system 400. The input/output device 440 can include a keyboard and/or pointing device (e.g., a mouse). The input/output device 440 can also include a display unit for displaying graphical user interfaces. The display unit can include a touch-sensitive display.

The system 400 can include one or more graphics processing units (e.g., NVIDIA® GeForce® 7300) which can be programmed to create the transitions described in reference to FIGS. 1-3. Transition effects can be developed using known graphics software, such as Quartz Composer graphics development environment available from Apple Inc. (Cupertino, Calif.). These transitions can be implemented using known operating system services and technologies. For systems employing the Mac OS X operating system, such technologies can include Core Image, Quartz2D, Cocoa, OpenGL, Cascade Style Sheets, JavaScript, QuickTime, etc.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

A number of implementations have been described. Nevertheless, it will be understood that various modifications may be made. For example, elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:
    detecting a trigger event associated with a cursor;
    obtaining a current state of the cursor, where the current state is associated with a first cursor image;
    obtaining a target state of the cursor, where the target state is associated with a second cursor image;
    determining a transition type based on the trigger event and the current state of the cursor; and
    applying a transition effect corresponding to the transition type to the cursor over a transition time to transform the cursor from the current state to the target state where during the transformation at least a portion of the first cursor image and at least a portion of the second cursor image can be simultaneously visually perceived by a user.

2. The method of claim 1, where the current state and the target state are associated with different cursor types having different visual appearances.

3. The method of claim 1, where the current state and the target state are associated with different cursor schemes.

4. The method of claim 1, where the transition type is from a set of transition types including: dissolve, map, burn, fade, iris, mix, wipe, digital effect, slide, stretch, page peel and flash animation.

5. The method of claim 1, where the current state of the cursor is associated with a cursor type from a set of cursor types including: arrow, text cursor, hand, wait, edit, move, and resize.

6. A system comprising:
    a processor;
    a memory coupled to the processor and operable for causing the processor to perform operations comprising:
    detecting a trigger event associated with a cursor;
    obtaining a current state of the cursor, where the current state is associated with a first cursor image;
    obtaining a target state of the cursor, where the target state is associated with a second cursor image;
    determining a transition type based on the trigger event and the current state of the cursor; and
    applying a transition effect corresponding to the transition type to the cursor over a transition time to transform the cursor from the current state to the target state where during the transformation at least a portion of the first cursor image and at least a portion of the second cursor image can be simultaneously visually perceived by a user.

7. The system of claim 6, where the current state and the target state are associated with different cursor types.

8. The system of claim 6, where the current state and the target state are associated with different cursor schemes.

9. The system of claim 6, where the transition type is from a set of transition types including: dissolve, map, burn, iris, mix, wipe, digital effect, slide, stretch, page peel and flash animation.

10. The system of claim 6, where the current state of the cursor is associated with a cursor type from a set of cursor types including: arrow, text cursor, hand, wait, edit, move, and resize.

11. A non-transitory computer-readable medium including instructions which, when executed by one or more processors, causes:
   detecting a trigger event associated with a cursor;
   obtaining a current state of the cursor, where the current state is associated with a first cursor image;
   obtaining a target state of the cursor, where the target state is associated with a second cursor image;
   determining a transition type based on the trigger event and the current state of the cursor; and
   applying a transition effect corresponding to the transition type to the cursor over a transition time to transform the cursor from the current state to the target state where during the transformation at least a portion of the first cursor image and at least a portion of the second cursor image can be simultaneously visually perceived by a user.

12. The non-transitory computer-readable medium of claim 11, where the current state and the target state are associated with different cursor types having different visual appearances.

13. The non-transitory computer-readable medium of claim 11, where the current state and the target state are associated with different cursor schemes.

14. The non-transitory computer-readable medium of claim 11, where the transition type is from a set of transition types including: dissolve, map, burn, fade, iris, mix, wipe, digital effect, slide, stretch, page peel and flash animation.

15. The non-transitory computer-readable medium of claim 11, where the current state of the cursor is associated with a cursor type from a set of cursor types including: arrow, text cursor, hand, wait, edit, move, and resize.

* * * * *